(12) United States Patent
Panholzer

(10) Patent No.: US 6,930,407 B2
(45) Date of Patent: Aug. 16, 2005

(54) METHOD FOR PRODUCING A HYDROPOWER PLANT

(75) Inventor: Heinz Panholzer, Altenberg (AT)

(73) Assignee: VA Tech Hydro GmbH & Co., Vienna (AT)

( * ) Notice: Subject to any disclaimer, the term of this patent is extended or adjusted under 35 U.S.C. 154(b) by 0 days.

(21) Appl. No.: 10/865,781

(22) Filed: Jun. 14, 2004

(65) Prior Publication Data

US 2004/0222641 A1 Nov. 11, 2004

Related U.S. Application Data

(63) Continuation of application No. PCT/EP02/13275, filed on Nov. 26, 2002.

(30) Foreign Application Priority Data

Dec. 20, 2001 (AT) ................................. A 2003/2001

(51) Int. Cl.⁷ .............................................. F03B 13/10
(52) U.S. Cl. .............................. 290/53; 290/44; 405/78
(58) Field of Search ...................... 290/54, 43; 405/78

(56) References Cited

U.S. PATENT DOCUMENTS

| | | | | |
|---|---|---|---|---|
| 4,053,787 A | * | 10/1977 | Diggs | 290/54 |
| 4,078,388 A | * | 3/1978 | Atencio | 405/78 |
| 4,117,676 A | * | 10/1978 | Atencio | 60/327 |
| 4,163,904 A | * | 8/1979 | Skendrovic | 290/54 |
| 4,170,428 A | * | 10/1979 | Atencio | 405/78 |
| 4,207,015 A | * | 6/1980 | Atencio | 405/78 |
| 4,311,410 A | * | 1/1982 | Gutierrez Atencio | 405/78 |
| 4,345,159 A | * | 8/1982 | Gutierrez Atencio | 290/43 |
| 4,352,989 A | | 10/1982 | Gutierrez Atencio | |
| 4,540,313 A | * | 9/1985 | Broome | 405/78 |
| 4,746,244 A | * | 5/1988 | Broome | 405/78 |
| 4,755,690 A | | 7/1988 | Obermeyer | |
| 4,804,855 A | | 2/1989 | Obermeyer | |
| 4,955,789 A | * | 9/1990 | Chacour et al. | 415/201 |
| 5,430,332 A | * | 7/1995 | Dunn, Jr. | 290/54 |
| 5,825,094 A | | 10/1998 | Hess | |
| 6,146,096 A | * | 11/2000 | Winkler | 415/220 |
| 6,281,597 B1 | | 8/2001 | Obermeyer et al. | |

FOREIGN PATENT DOCUMENTS

| | | | |
|---|---|---|---|
| EP | 1083333 | 3/2001 | |
| WO | 89/00646 | 1/1989 | |
| WO | WO 3049257 A2 * | 6/2003 | H02K/07/18 |

OTHER PUBLICATIONS

Solar turbines Incorporated, T4500 Centaur Gas Turbine Catalog 1986, pp. 20 and 46.*
K. Dorfmeister et al., Elektrotechnik und Informationstechnik, Springer Verlag, vol. 114, No., 10, 1997, pp. 552–554, 555–55.

* cited by examiner

Primary Examiner—Joseph Waks
(74) Attorney, Agent, or Firm—Greenblum & Bernstein, P.L.C.

(57) ABSTRACT

Method for producing a device for obtaining electrical energy from hydropower and a method for modifying a dam, in which, at a remote production site, at least two turbine-generating units, comprising a turbine and a generator connected to it, are produced, at a remote production site at least two turbine-generator units are connected to one another to form at least one module including at least two turbine-generator units. The at least one module is transported from the production site over a distance to the site of use by a transport, and, at the site of use, the at least one module is lifted off the transport by a lifting fixture and is moved into a position which is provided for its operation. The instant abstract is neither intended to define the invention disclosed in this specification nor intended to limit the scope of the invention in any way.

26 Claims, 3 Drawing Sheets

METHOD FOR PRODUCING A HYDROPOWER PLANT

CROSS-REFERENCE TO RELATED APPLICATIONS

The present application is a continuation of International Patent Application No. PCT/EP02/13275, filed Nov. 26, 2002, the disclosure of which is expressly incorporated by reference herein in its entirety. Moreover, the instant continuation application claims priority of Austrian Application No. A 2003/2001 filed Dec. 20, 2001.

BACKGROUND OF THE INVENTION

1. Field of the Invention

The present invention relates to a method for producing a device for obtaining electrical energy from hydropower, and to a method for modifying a dam, in particular a weir.

2. Discussion of Background Information

The production of hydroelectric power plants entails a high expenditure of construction work, for example the production of a retaining dam, of a penstock, of a powerhouse, etc., compared to the production of other power plants, such as natural gas, coal, etc., and consequently the costs of obtaining energy are in relative terms higher and/or an amortization time of the investment accordingly increases considerably. Furthermore, a power plant of this type represents a significant intervention in the ecology of the waterway. Therefore, where other energy sources are available, hydropower is in many cases, in particular for high powers, is difficult to justify from economic and ecological standpoints.

A different route is followed by WO 89/00646 A1, which describes a method for producing a hydroelectric power plant at an existing dam. In this case, part of a module for generating electrical energy is produced at a remote production site, transported to the site of use, and completed on site by installing the required hydraulic machinery. In this method, it is still necessary to carry out complex assembly work on site, and the corresponding tools, auxiliary devices, and labor are also required for this purpose.

Therefore, the present invention is based on providing a method for producing a device for obtaining electrical energy which, compared to conventional power plants, is less expensive and is more justifiable from an ecological standpoint, and in particular is able to compete with other energy sources. Furthermore, the present invention is based on providing a novel method for modifying a dam, which satisfies the above demands.

SUMMARY OF THE INVENTION

According to the invention, a method for producing a device for obtaining electrical energy from hydropower, includes production of at least two turbine-generator units, comprising a turbine and a generator connected to it, connection of at least two turbine-generator units to one another to form at least one module, transportation of at least one module by a transport, preferably a water-borne craft, from the production site over a distance to the site of use, and, at the site of use, lifting of the at least one module off the transport by a lifting fixture and positioning it in a position which is provided for its operation.

Further, the inventive method for modifying a dam, in particular a weir, includes selection of an existing dam having an upper water level and a lower water level, and having at least two stationary structures, in particular piers, and having moveable structures for controlling the level, e.g. a gate or flap, arranged between the stationary structures, production of at least two turbine-generator units, comprising a turbine and a generator connected to it, connection of at least two turbine-generator units to one another to form at least one module, transportation of at least one module from the production site over a distance to the site of use by of a transport, preferably a water-borne craft, and, at the site of use, lifting of the at least one module off the transport by a lifting fixture provided at the dam, and positioning it in a position, which is provided for its operation, between two stationary structures, the module being used to obtain electrical energy in its operating position instead of or in addition to the moveable structure.

The possibility of prefabricating turbine-generator units and connecting them to form a module at a remote location, e.g. a dockyard, makes it possible to produce the energy-generating units relatively inexpensively and to test them in advance, so that significantly faster assembly and rapid commissioning are possible in situ. Furthermore, according to the invention transport by a ship is possible, which can be achieved significantly less expensively and more quickly for the large electromechanical units used in river power plants. It is also possible for the positioning and final installation of the electromechanical units to be carried out by a crane, which is in any case already present for other purposes at dams, so that there is no need to use standard construction cranes. The present invention is particularly advantageous for use in an existing dam which, although constructed for purposes other than energy generation, can be converted to an energy-generating installation using the method according to the invention, since for this application the construction costs, for example for constructing the powerhouse, are eliminated altogether. In combination with the special modular configuration of the electromechanical units, it is now possible, using the method according to the invention, to use a technology which is inherently highly environmentally friendly, such as hydropower, to obtain energy under economically attractive framework conditions, and what is more without any further intervention in the ecological system. The modification may advantageously be used as a technical measure for reducing greenhouse gases.

Another aspect of the invention can include the production of draft tubes with draft-tube closures arranged thereon if appropriate. The method can further include the installation of electrical switchgear, e.g. a power circuit breaker, fixed to the module. The electrical switchgear, e.g. a power circuit breaker, can be installed in or on the dam and is connected to the module. The at least one module can be tested. The method can include the at least one module being transported in an upright position which corresponds to its operating position.

One aspect of the present invention includes a method of producing a device for obtaining electrical energy from hydropower. The method includes producing, at a production site, at least one turbine-generator unit, comprising a turbine and a generator, the production site being located away from a site of use of the at least one turbine-generator unit, transporting the at least one turbine-generator unit from the production site over a distance to the site of use by a waterborne-craft, and positioning, at the site of use, the at least one turbine-generator unit into a position for its operation. The at least one turbine-generator unit can comprise a plurality of turbine-generator units. The method can further includes connecting, at the production site, at least two of the plurality of turbine-generator units to one another to form at least one module. The positioning can include lifting the at least one module off the transport with a lifting fixture. The method can include producing draft tubes with draft-tube closures arranged on the at least one module. The producing can include installing electrical switchgear to the at least one module. The electrical switchgear can include a circuit breaker. The device can form at least in part, a dam, and the method further includes installing electrical switchgear in or on the dam and connecting, at a location remote from the production site, the electrical switchgear to the at least one module. The method can also include testing the at least one module at the production site. The transporting can include transporting in an upright position corresponding to its operating position.

Another aspect of the invention includes a method of modifying a dam, the method includes producing at least one turbine-generator unit, comprising a turbine and a generator, at a production site, the production site being located away from the dam, transporting the at least one turbine-generator unit from the production site over a distance to the dam by a water-borne craft, and positioning, at the dam, the at least one turbine-generator unit between two stationary structures in an operating position to generate electrical energy. The method can include selecting an existing dam having an upper water level and a lower water level, and having at least two stationary structures having moveable structures that control the level arranged between the stationary structures. The moveable structures that control the level can be one of a gate and a flap. The at least two stationary structures can be piers. The at least one turbine-generator unit can be positioned one of instead of and in addition to the moveable structures. The method can include connecting, at the production site, at least two of the turbine-generator units to one another to form at least one module. The positioning can include lifting the at least one module off a transport with a lifting fixture. The method can include producing draft tubes with draft-tube closures arranged on the at least one module. The method can include installing electrical switchgear to the at least one module. The electrical switchgear can comprise a circuit breaker. The method cam also include installing electrical switchgear in or on the dam and connecting, at a location remote from the production site, the electrical switchgear to the at least one module. The method can further include testing the at least one module at the production site. The transporting can comprise transporting in an upright position corresponding to its operating position. The dam can be a weir.

Yet another aspect of the invention includes a dam with a hydropower plant produced at a production site, with at least one turbine-generator unit, including a turbine and a generator, the production site being located away from a site of use of the at least one turbine-generator unit, transporting the at least one turbine-generator unit from the production site over a distance to the site of use, and positioning, at the site of use, the at least one turbine-generator unit into a position for its operation. The hydropower plant composed of the at least one turbine-generator unit.

Another aspect of the invention includes a dam including a hydropower plant composed of the at least one turbine-generator unit. The turbine and a generator being produced at a production site, the production site being located away from the dam, transporting the at least one turbine-generator unit from the production site over a distance to the dam, and positioning, at the dam, the at least one turbine-generator unit between two stationary structures in an operating position to generate electrical energy to compose a hydropower plant.

Additional details and advantages of the method according to the invention will emerge from the following description of a nonlimiting exemplary embodiment, in which reference is made to the appended figures.

BRIEF DESCRIPTION OF THE DRAWINGS

The present invention is explained in more detail with reference to the diagrammatic, nonlimiting FIGS. 1 to 5.

DETAILED DESCRIPTION OF THE PRESENT INVENTION

Figure 1:
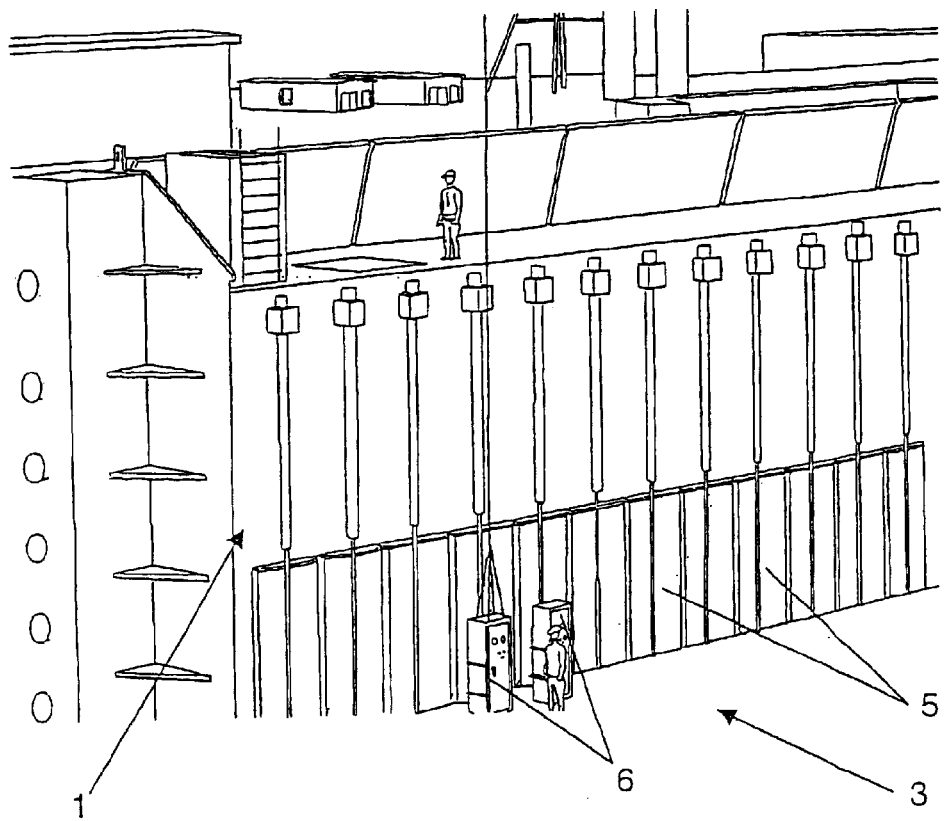
FIGS. 1 to 5 show, by way of example, the sequence involved in the inventive method for producing a device for obtaining electrical energy from hydropower.

In FIG. 1, the module 1 is located at the transport, in this case a ship 3, at a production site in a dockyard, which does not correspond to or located near the future site of use. At this production site, a plurality of turbine-generator units 2 are connected to one another, preferably directly at the ship 3, to form a module 1 for obtaining electrical energy. If necessary, it is, of course, also possible for a plurality of modules 1 comprising turbine-generator units 2 to be assembled at the same ship 3 or a different ship.

The draft tubes of the turbine-generator units 2, with draft-tube closures 5 arranged thereon, are in the present example an integral part of the steel structure of the module. The draft-tube closures 5 may, as in this example, be assigned to a plurality of turbine-generator units 2.

Furthermore, at this production site, which is remote from the site of use, if appropriate electrical switchgear 6, such as control units, power circuit breakers, compensation units, etc. which are fixed to the module are installed in the module 1. However, this electrical switchgear 6 may also be fitted at any other desired location, e.g. at the weir 11 at the site of use, and do not have to be integrated in the modules 1 at the production site of the modules 1.

Furthermore, the modules 1 are provided, in the region of the turbine-generator units 2, at their upstream wide side, with a grate 7, in order to prevent flotsam and other solid materials from being able to enter the turbine-generator units 2, which could destroy the turbine-generator units 2. To allow this grate 7 to be cleaned, it is also possible for grate-cleaning machines, which have long been known and are not shown, to be arranged, so that the grate 7 can be cleaned automatically in operation.

Figure 2:
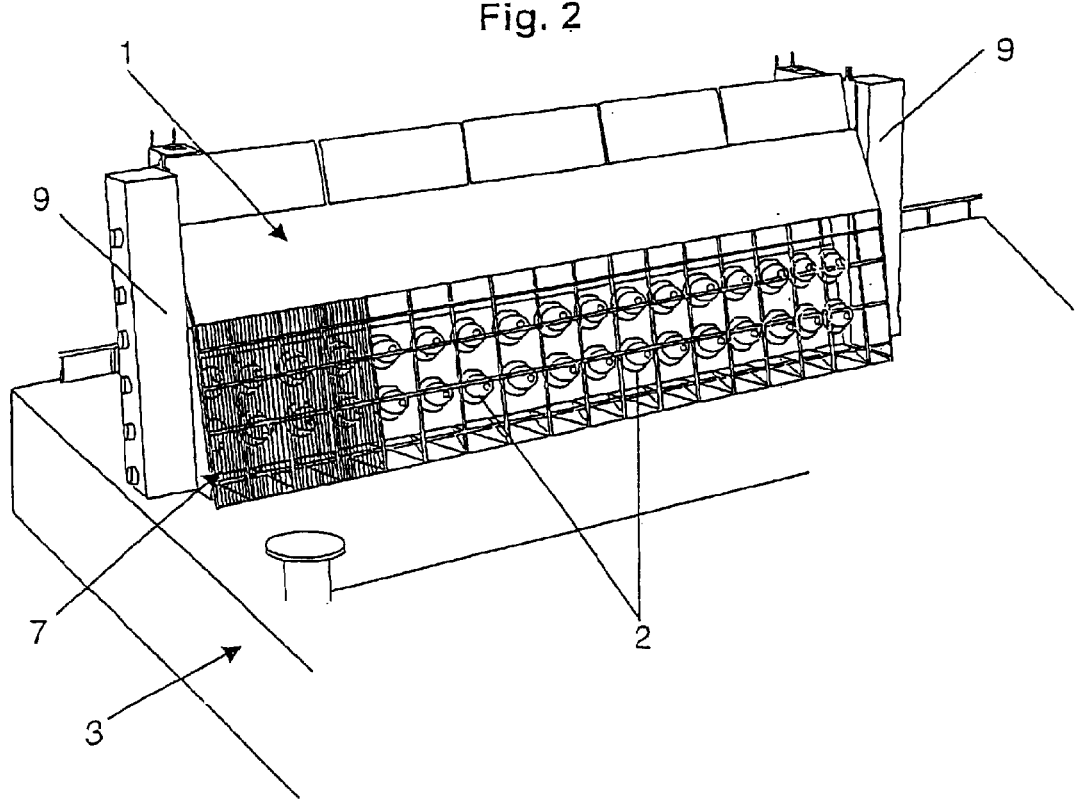

FIG. 2 shows a fully assembled module 1 having a multiplicity of turbine-generator units 2 and the grate 7, which is arranged at the end of a ship 3 ready for transport to the site of use, preferably in an upright position, which corresponds to the operating position. It is preferably transported on the same waterway on which there is an existing weir 11 into which the module 1 is to be fitted.

In this example, the module 1 has already been provided with sliding units 9, in this case rolling boxes, which the module 1 can be raised and lowered along vertical guides in the weir 11. The module 1 is rigidly connected to the sliding units 9, for example by bolted connections.

Figure 3:
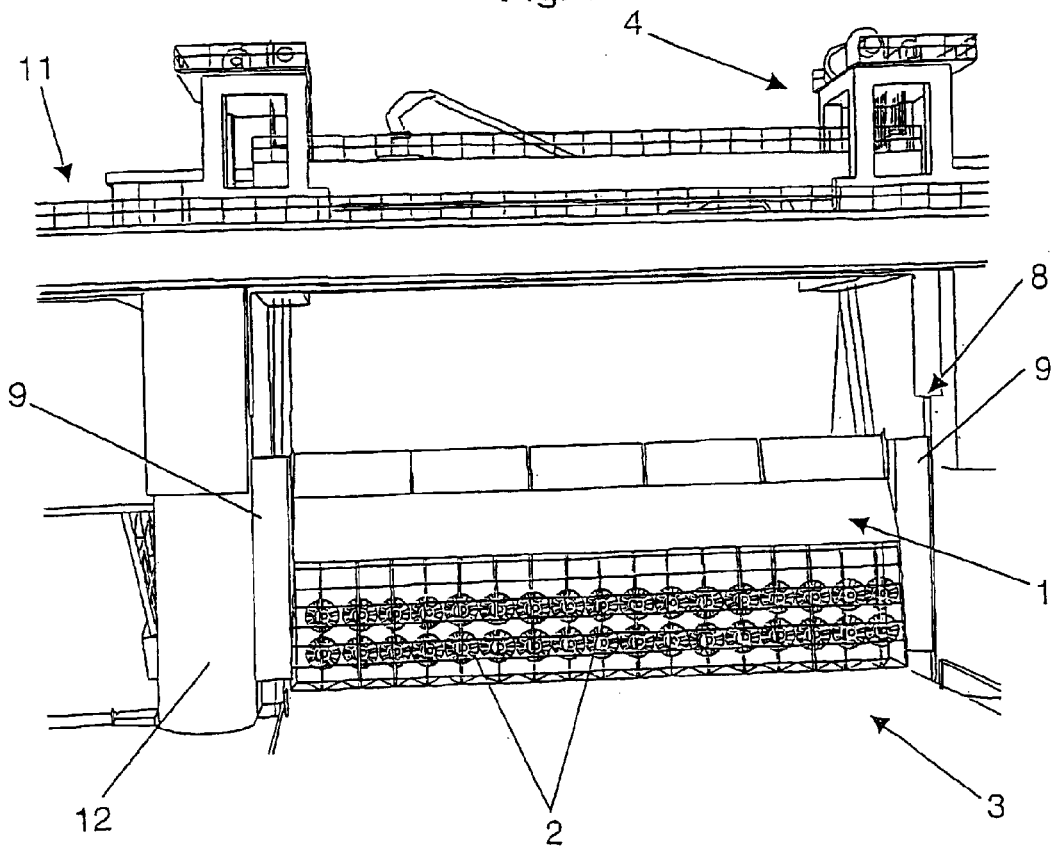

FIG. 3 shows the ship 3 with the module 1 which has arrived at the site of use, in this case a weir 11 with at least two piers 12. The ship 3 is then navigated in such a way that the module 1, preferably in its operating position, comes to stand upstream between two adjacent piers 12 of the weir 11. The ship 3 is preferably anchored in this position in order to allow safe working and/or installation. At the weir 11, there is a lifting fixture 4, which is connected to the module 1.

The piers 12 of the weir 11 have been prepared in advance to receive the module 1. For this purpose, vertical guides 8 have been provided at the piers 12, and the sliding units 9, such as for example a rolling box, can be guided movably in these guides. In many existing dams, guides 8 of this type are already present and can very advantageously be used without modification as guides 8 for the sliding units 9.

The lifting device 4 then lifts the module 1 off the ship 3 and moves the module 1 into a position in which the sliding units 9 of the module 1 are inserted into the guides on both sides of the module 1. The guides 8 and the sliding units 9 may, of course, also be designed in such a way that there is no need for a lifting device 4 to insert them. The ship 3 then moves away from the weir 11 and clears the waterway for lowering of the module 1.

In this example, the sliding units 9 have already been pre-fitted to the module 1 and the module 1 is moveably connected to the weir 11 through the sliding units 9 during insertion of the module 1 into the weir 11. However, it is also conceivable for the sliding units 9 to have been pre-fitted in the guides 8 and for the module 1, at the site of use, simply to be lifted into a position between the piers 12 in order for the module 1 to be connected to the sliding units 9, in which case a rigid connection, e.g. by bolts, is then produced between module 1 and sliding units 9.

Figure 4:
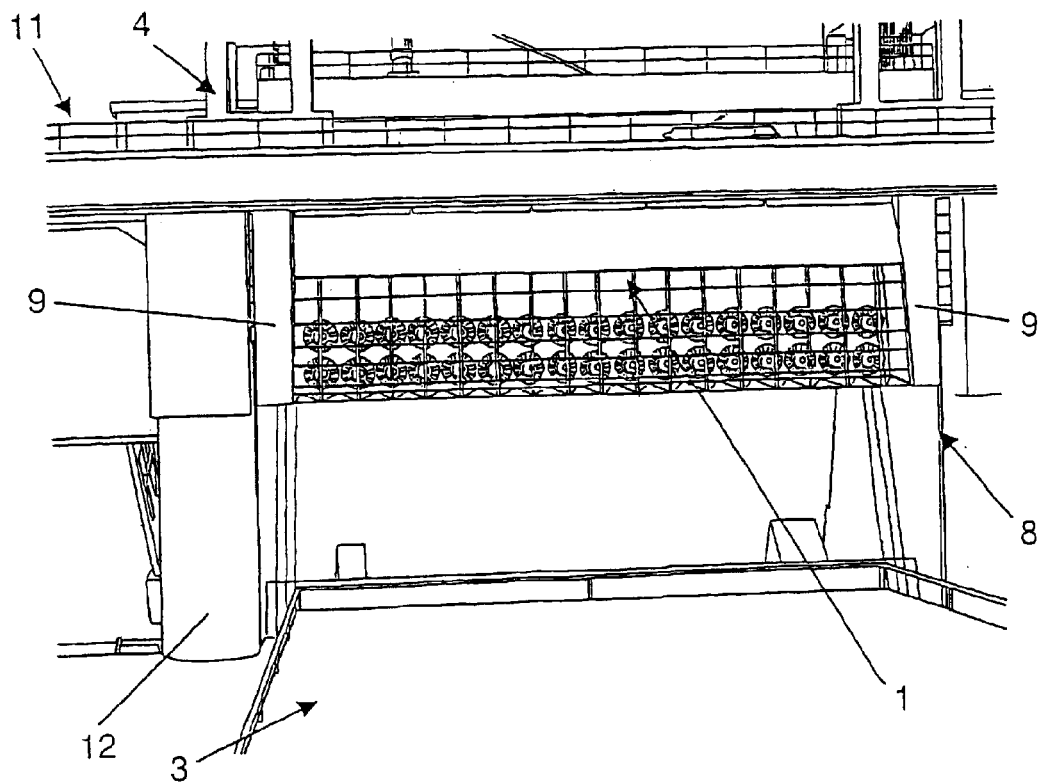

In FIG. 4, the module 1 with the sliding units 9, in this case a rolling box has already been mounted in the guides 8 and is in an upper, raised position. The space between module 1 and guide 8 or sliding units 9 is now also sealed so that water cannot flow through it, so that all the energy of the water can be utilized.

The modules 1, which have now been fully assembled, can then be lowered into an operating position, i.e. a position in which the turbine-generator units 2 are arranged below the surface of the water and water can flow through them.

Figure 5:
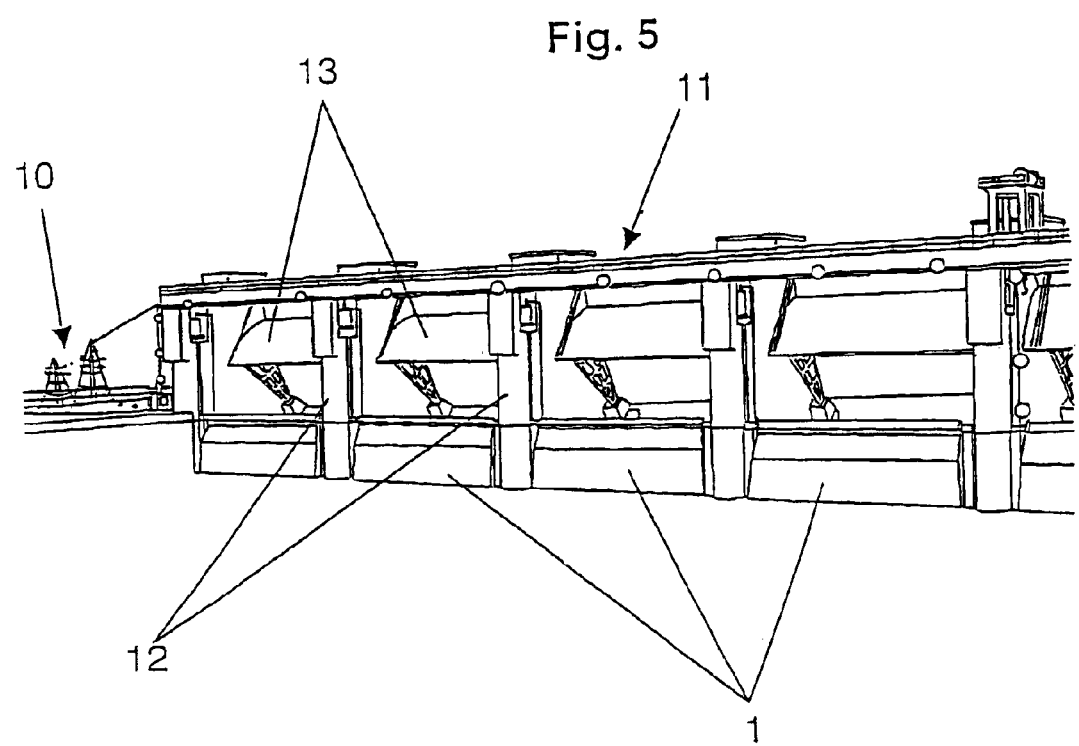

FIG. 5 shows a weir 11 with a plurality of piers 12, with in each case one module 1 for obtaining electrical energy arranged between two adjacent piers 12. The modules 1 are all in their operating position. The weir 11 has at least one moveable structure for controlling the level of water, e.g. a gate, flap 13, which is arranged between the stationary structures such as the piers 12.

To allow the electrical energy obtained to be removed, the modules 1 are electrically connected to a power supply network 10, preferably with a transformer connected between them. The electrical energy obtained is therefore fed directly into a power supply network 10. Existing dams, such as in the present example a weir 11, can be additionally usefully exploited in this way. This method therefore represents an extremely ecologically and economically favorable way of obtaining energy.

Before the module 1 is introduced into an operating position for the first time, it is, of course, possible to carry out any desired test, such as dry and wet tests or load tests, in order to be able to ensure the functionality of the module 1. Moreover, the modules 1 can also be connected to a central control unit, allowing central control of the energy production taking account of other aspects, such as for example predetermined minimum or maximum levels at the dam or operating states or levels of other power plants.

Further necessary connections to the module 1, such as for example hydraulic lines, are also completed in the appropriate way before the module 1 is commissioned for the first time.

What is claimed:

1. A method of producing a device for obtaining electrical energy from hydropower, the method comprising:
   producing, at a production site, at least one turbine-generator unit, comprising a turbine and a generator, the production site being located away from a site of use of the at least one turbine-generator unit;
   transporting the at least one turbine-generator unit from the production site over a distance to the site of use by a waterborne-craft; and
   removing the at least one turbine-generator unit from the waterborne-craft and positioning, at the site of use, the at least one turbine-generator unit into a position at a dam for its operation.

2. The method according to claim 1, wherein the at least one turbine-generator unit comprises a plurality of turbine-generator units.

3. The method according to claim 2, further comprising:
   connecting, at the production site, at least two of the plurality of turbine-generator units to one another to form at least one module.

4. The method according to claim 3, wherein the positioning includes lifting the at least one module off the waterborne-craft with a lifting fixture.

5. The method according to claim 3, further comprising:
   producing draft tubes with draft-tube closures arranged on the at least one module.

6. The method according to claim 3, wherein the producing further comprises:
   installing electrical switchgear to the at least one module.

7. The method according to claim 6, wherein electrical switchgear comprises a circuit breaker.

8. The method according to claim 3, wherein the device forms at least in part, a dam, and the method further comprises:
   installing electrical switchgear in or on the dam and connecting, at a location remote from the production site, the electrical switchgear to the at least one module.

9. The method according to claim 3, further comprising:
   testing the at least one module at the production site.

10. The method according claim 3, wherein the transporting comprises transporting in an upright position corresponding to its operating position.

11. A dam produced according to claim 1, comprising a hydropower plant composed of the at least one turbine-generator unit.

12. A method of modifying a dam, the method comprising:
   producing at least one turbine-generator unit, comprising a turbine and a generator, at a production site, the production site being located away from the dam;
   transporting the at least one turbine-generator unit from the production site over a distance to the dam by a water-borne craft; and
   removing the at least one turbine-generator unit from the waterborne-craft and positioning, at the dam, the at least one turbine-generator unit between two stationary structures in an operating position to generate electrical energy.

13. The method according to claim 12, further comprising:
   selecting an existing dam having an upper water level and a lower water level, and having at least two stationary structures having moveable structures that control the level arranged between the stationary structures.

14. The method according to claim 13, wherein the moveable structures that control the level are one of a gate and a flap.

15. The method according to claim 13, wherein the at least two stationary structures are piers.

16. The method according to claim 13, wherein the at least one turbine-generator unit is positioned one of instead of and in addition to the moveable structures.

17. The method according to claim 12, further comprising:
connecting, at the production site, at least two of the turbine-generator units to one another to form at least one module.

18. The method according to claim 17, wherein positioning further comprises:
lifting the at least one module off the water-borne craft with a lifting fixture.

19. The method according to claim 17, further comprising:
producing draft tubes with draft-tube closures arranged on the at least one module.

20. The method according to claim 17, further comprising:
installing electrical switchgear to the at least one module.

21. The method according to claim 20, wherein the electrical switchgear comprises a circuit breaker.

22. The method according to claim 17, further comprising:
installing electrical switchgear in or on the dam and connecting, at a location remote from the production site, the electrical switchgear to the at least one module.

23. The method according to claim 17, further comprising:
testing the at least one module at the production site.

24. The method according claim 17, wherein the transporting comprises transporting in an upright position corresponding to its operating position.

25. The method according claim 12, wherein the dam is a weir.

26. A dam modified according to claim 12 comprising a hydropower plant composed of the at least one turbine-generator unit.

* * * * *